(No Model.) 3 Sheets—Sheet 3.
J. W. SVOBODA.
CORN PLANTER.
No. 576,483. Patented Feb. 2, 1897.
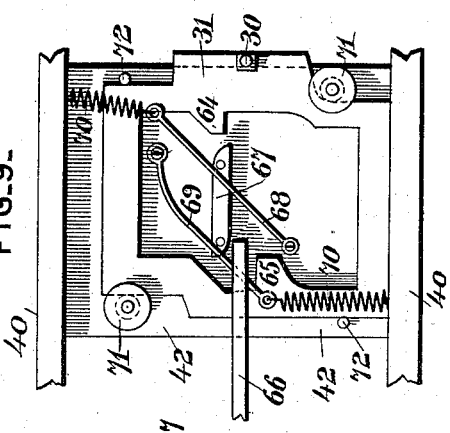
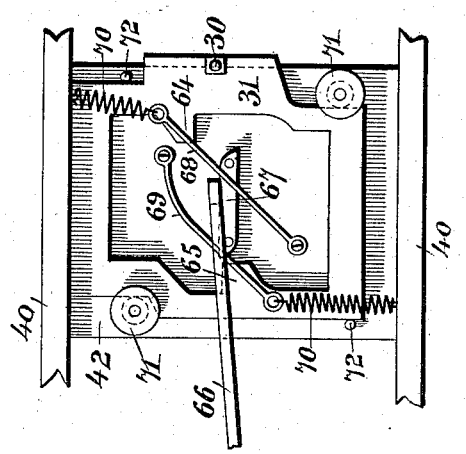
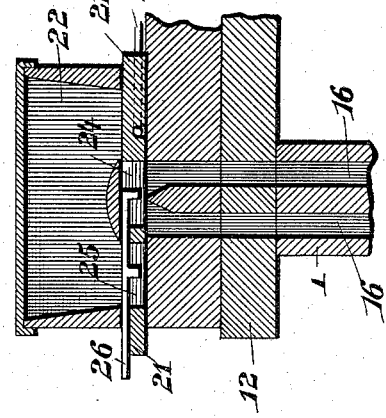
Witnesses
Jas. K. M?Cuthran
V. B. Hillyard
By his Attorneys,
C. A. Snow & Co.
Inventor
John W. Svoboda

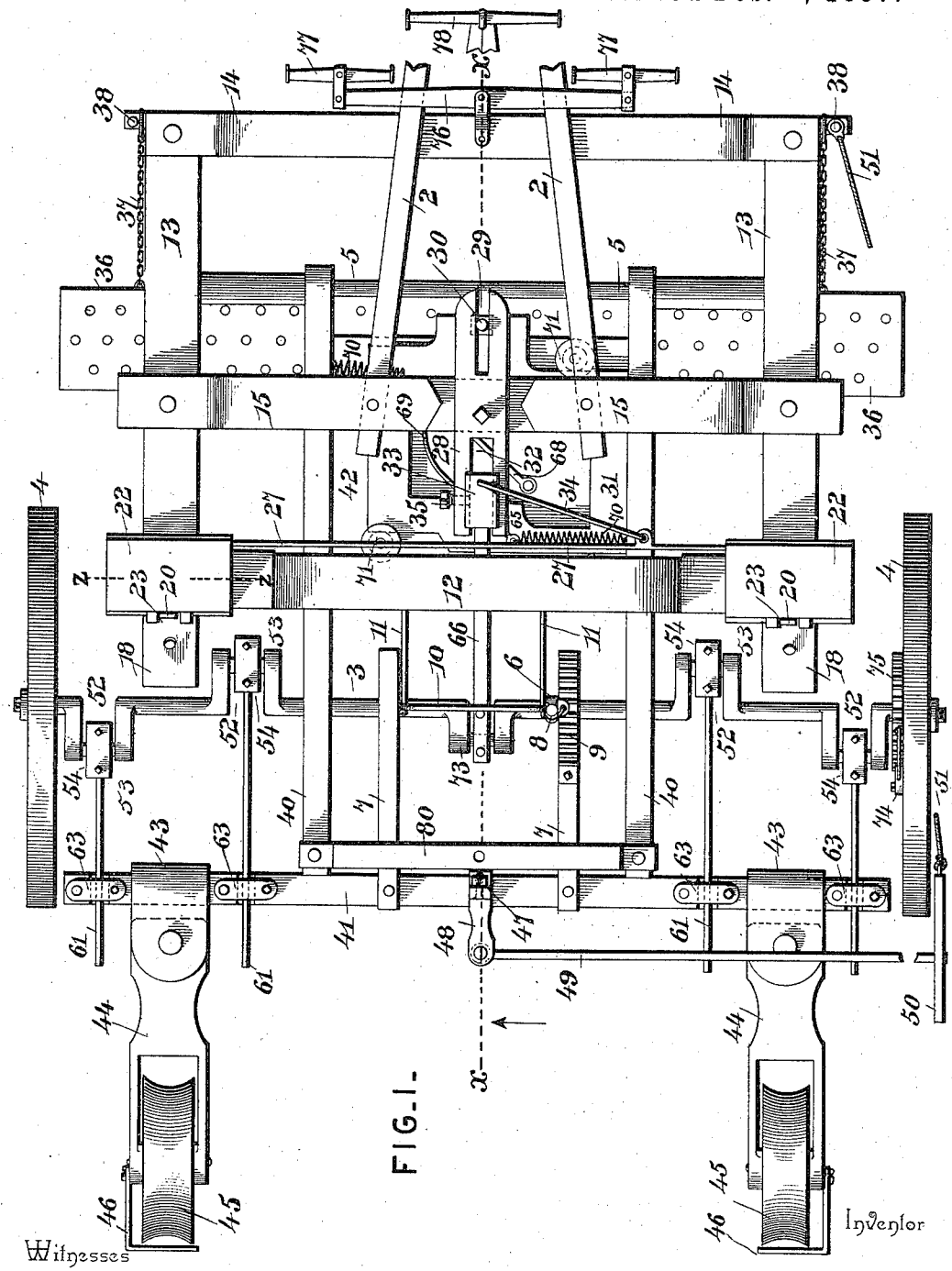

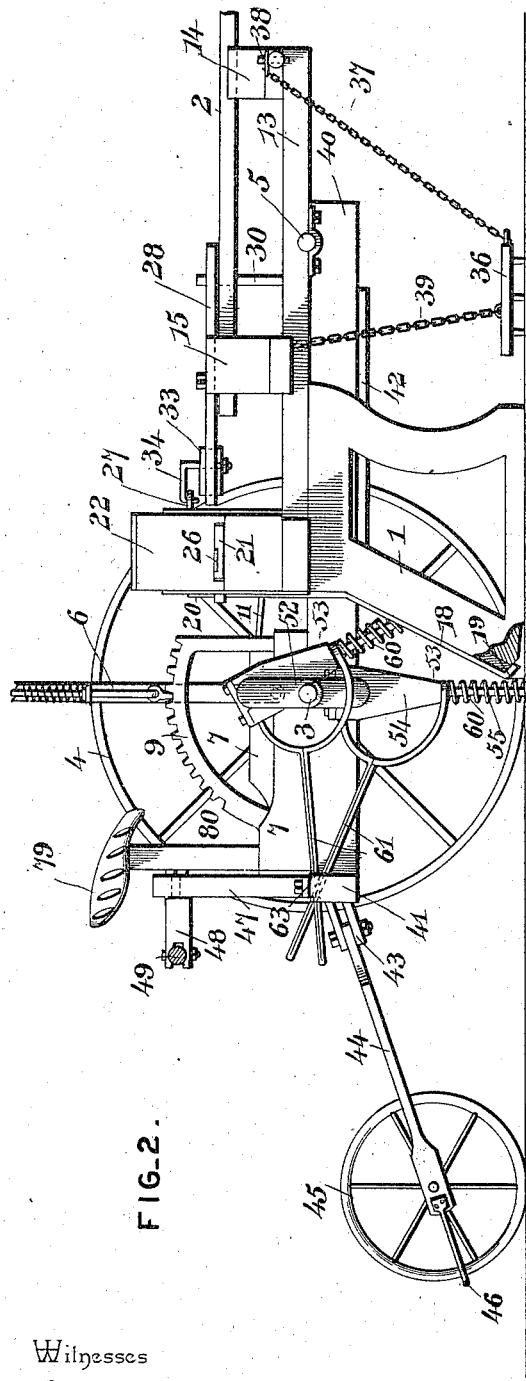

UNITED STATES PATENT OFFICE.

JOHN W. SVOBODA, OF HOWELL, NEBRASKA.

CORN-PLANTER.

SPECIFICATION forming part of Letters Patent No. 576,483, dated February 2, 1897.

Application filed March 17, 1896. Serial No. 583,568. (No model.)

*To all whom it may concern:*

Be it known that I, JOHN W. SVOBODA, a citizen of the United States, residing at Howell, in the county of Colfax and State of Nebraska, have invented a new and useful Corn-Planter, of which the following is a specification.

This invention relates to planting-machines.

The principal object of the improvement is to dispense with the wire or line generally employed to effect a planting of the seed in check-rows and to provide for the alining of the actuating mechanism, so that the seed will be dropped in hills in longitudinal and transverse lines, thereby attaining the same result as produced by the ordinary check-line.

The planter in its general construction combines a harrowing attachment, furrow-openers to provide trenches for receiving the seed, a planting mechanism for dropping the seed into the furrows or trenches, markers for indicating the hills, and furrow-coverers for closing the trenches and compressing the soil around the seed, so as to hasten germination.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a planter for attaining the ends sought to be effected by this invention. Fig. 2 is a side elevation thereof, the ground-wheel on the near side being removed. Fig. 3 is a longitudinal section on the line X X of Fig. 1. Fig. 4 is a detail view of a marker and its guide. Fig. 5 is a detail perspective view of a runner, showing the grain-passages. Fig. 6 is a detail view of the lever for closing the open sides of the grain-passages in the runner and for controlling the discharge of the seed. Fig. 7 is a detail view of a seed-slide. Fig. 8 is a detail section of the hopper and seed-slide about on the line Z Z of Fig. 1. Fig. 9 is a plan view of the mechanism for actuating the seed-dropping devices. Fig. 10 is a view similar to Fig. 9, showing the parts differently related. Fig. 11 is a detail view of a portion of the main frame having the notch in which operates the guide of a marker, showing the keeper or plate for closing the notch turned to one side.

The planter comprises a draft-frame and a main frame, the draft-frame being mounted upon runners or furrow-openers 1 and provided with a pole or tongue 2 and the main frame having a compound crank-axle 3, provided at its extremities with ground-wheels 4, and these frames are flexibly connected by means of a rod 5, and the front end of the draft-frame is raised and lowered by means of a lever 6, fulcrumed to a bar or casting 7, attached to the main frame, the lever being provided with a hand-latch 8 of ordinary construction, which engages with a notched segment 9, by means of which the lever is held in the located position. An arched frame 10 is operatively connected with the lever 6, and its side members have pivotal connection with the bar 7 and a companion bar 11 and are projected beyond the said pivotal points and have connection at their extremities with the rear arched bar 12 of the draft-frame.

The draft-frame comprises longitudinal side bars 13, a rear arched bar 12, a front cross-bar 14, and an intermediate cross-bar 15, the several bars being secured together in a substantial way at their meeting ends. The runners 1 are attached to the side bars 13 and are preferably cast, and their rear sides are formed with parallel grain-passages 16, which are open at their outer or rear sides and communicate with a space 17 at the lower rear end of each runner. A lever 18 closes the open side of the grain-passages 16, and has a lug 19 at its lower end, forming a gate which operates in the space 17, so as to alternately close the lower ends of the adjacent grain-passages 16. This lever 18 is fulcrumed between its ends to the rear side of the runner and has a vertical extension 20 at its upper end to engage with the seed-slide 21. It is to be understood that there is a runner at each side of the machine and that each runner is similarly constructed and equipped. Hence the detailed description herein suffices for both. A hopper 22 is located at each end of the arched bar 12 and directly over the rear end of the adjacent runner, and a seed-slide 21 operates over its bottom and through its sides. Each seed-slide has a rear extension formed with a notch 23 to receive the vertical extension 20 of the lever 18, and elongated openings 24 and 25 in different planes, and the size of these openings 24 and 25 is regulated by a plate 26, slidably fitted in a groove or seat in the said seed-slide and having its inner end portions projecting into the openings 24 and 25, so that by moving the plate 26 inward the openings 24 and 25 will be reduced, and upon moving it out the size of the said openings will be increased, thereby making provision for regulating the amount of seed to be delivered to a grain-passage at each operation of a seed-slide. A rod 27 connects the seed-slides at opposite sides of the machine and causes them to move in unison. A lever 28, fulcrumed between its ends to the cross-bar 15, has a slot 29 at its front end to receive a pin 30, projecting vertically from a reciprocating plate 31, and a slot 32 at its rear end, in which is slidably fitted a block 33, to which is attached one end of a pitman 34, the opposite end of the said pitman having connection with the rod 27. By adjusting the block 33 the stroke of the pitman 34 and the rod 27 is varied, thereby controlling the amplitude of movement of the seed-slides. Any suitable means may be employed for securing the block 33 in the adjusted position, and, as shown, a binding-screw 35 is adapted to bear against the side of the block to effect this purpose.

A harrow 36 is arranged to operate in advance of the runners 1 and may be of suitable construction, and, as shown, it consists of a board having a series of teeth projecting from its lower side and arranged so as to pulverize and level the soil in advance of the planting. Connections 37 unite the harrow with end extensions of the cross-bar 14 and may be either chains, cords, or rods, pins 38 passing through the end extensions of the bar 14 to retain the connections in engagement therewith. Other connections 39 are interposed between the harrow and the cross-bar 15 and act jointly with the connections 37 to maintain the harrow in proper working relation.

The main frame comprises side bars 40, a rear cross-bar 41, and a table or platform 42, the latter being located at the forward portion of the frame and secured to the side bars 40. The rear cross-bar 41 projects beyond the side bars 40 and is of a length about equal to the crank-axle 3 and is supplied with shackles or clips 43, to which frames 44 are pivotally connected, so as to swing horizontally, and which support the covering-wheels 45, the parts being disposed so that the covering-wheels track in the path of the runners 1. Cleaners 46 are secured to the frames 44, and their rear ends are bent to extend across the tread of the covering-wheels 45, so as to remove trash and adhering earth therefrom.

A standard 47 projects vertically from the cross-bar 41 midway of its ends, and a coupling 48 is journaled horizontally in the upper end thereof, and a pole 49 has pivotal connection with the coupling and is provided at its outer end with a blade 50 to properly position the machine on the return travel in either direction, and a chain or cord 51 is attached to the blade 50, and its front end is adapted to be connected with either of the side pins 38 to strengthen and brace the outer end of the pole 49 and hold the blade 50 in working position. The parts are so disposed that the pole 49 can be turned from one side of the machine to the other, according to the direction of travel of the machine over the field.

The compound crank-axle has two crank portions 52 near each end exterior to the side bars 40 and so related that one comes upon each side of a straight line passing through a runner and the covering-wheel in the rear of the runner, and these crank portions extend in diametrically opposite directions, so as to alternately advance the markers 53 to their work. The markers, four in number, one for each crank portion 52, are duplicates. Hence a detailed description of one will be sufficient for a clear understanding of all. Each marker comprises a head 54 and a stem 55, the head having a notch or slot 56 in its upper end to receive the crank portion 52, upon which it is mounted, and provided with a block 57 for closing the open end of the notch or slot 56 after the marker has been placed upon its supporting-crank.

An indenting-plate 58 is loosely mounted upon the lower end of the stem 55 and is prevented from outward displacement by an enlargement 59 at the lower end of the stem, and a spring 60 is mounted upon the stem 55 and is confined between the head 54 and the indenting-plate 58 and serves to hold the latter against the enlargement or stop 59. The indenting-plate 58 is of sufficient area to clearly mark the ground, and by having it yieldingly mounted upon the stem it can move thereon when meeting a root, stone, or other hard substance, thereby preventing breaking or injury to the machine. The spring 60 is of sufficient tension to compel the indenting-plate 58 to enter the soil under normal conditions, thereby marking the land; but it will yield under abnormal conditions, so as to obviate injury to the marker or any part of the planter. A guide-arm 61 projects rearwardly from the head of each marker and operates in a notch or opening 62 in the rear cross-bar 41, thereby compelling the marker to maintain a practically upright position when traveling in its orbital path, due to the action of the crank portion 52, upon which it is mounted. A plate or bar 63 closes the notch or opening 62 and retains the guide-arm 61 therein when the machine is working, and this plate is removable or capable of being turned aside to admit of the guide-arm being lifted from engagement with the notch or opening 62, so as to throw the markers out of working relation when the machine is being transported or moved from one place to another, thereby preventing injury to the machine and markers, which would otherwise result by engagement of the markers with the road or the hard surface of the ground. The guide-arms 61 may be of suitable construction and attached to the markers in any convenient way, and, as shown, they are formed of stout wire, which is doubled upon itself and has its end portions separated and engaged, respectively, with the upper end of the heads 54 and with the upper end of the stems 55, thereby dividing the strain upon opposite sides of the crank portions upon which the markers are mounted.

The reciprocating plate 31 is placed upon the table or platform 42, and its middle portion is open or cut away, and its front edge has an inwardly-extending stop 64 and its rear edge a corresponding stop 65, the two stops 64 and 65 being arranged upon opposite sides of a longitudinal line. The active portions of the stops face one another and their rear edges recede, and the edge portions of the opening forward of the stops curve, as shown, to give proper clearance for the hooked end of the pitman 66 when the latter is shifted laterally, as will appear more fully hereinafter. A strip or cam 67 is secured to the top side of the table or platform 42 and extends lengthwise of the machine, and its corners at diagonally-disposed points are beveled to prevent the hooked end of the pitman 66 catching upon the extremities of the strip when the front end of the pitman is shifted laterally.

Two rods or bars 68 and 69 are diagonally disposed with respect to the strip 67 and the table 42 and extend about in parallel relation, and are secured at their opposite ends to the said table at points equidistant from the strip 67 in such a manner as to admit of their free ends having an arcuate movement. Springs 70 connect the free ends of the parts 68 and 69 with a convenient portion of the framework and serve to hold and return the said rods or bars to their normal position. In the preferable construction the parts 68 and 69 are formed of stout wire or light metal bars possessing elastic properties and firmly attached at one end to the table 42, so that the elasticity thereof will be sufficient to maintain and return the parts 68 and 69 to an initial position, the spring 70 serving simply to supplement the spring action of these parts. Flanged pulleys 71 are journaled to the table 42 and engage with the plate 31 at diagonally opposite points, and serve to maintain the plate upon the table and at the same time reduce the friction. Pins 72 are diagonally arranged in an inverse order to the flanged pulleys 71 and act jointly with the latter to maintain the reciprocating plate 31 in working position. The pitman 66 is mounted upon a crank portion 73 of the crank-axle 3 and is reciprocated thereby. Suppose that the stop 64 is in line with the strip 67 and the hooked end of the pitman 66 is moving forward against the tension of the rod 68. The latter will by reason of its diagonal position tend to force the hooked end of the pitman laterally or toward the left, thereby keeping it in close relation against the right-hand edge or side of the strip 67. When the pitman has moved forward a sufficient distance so as to clear the front end of the strip 67, it will be given a lateral flirt by reason of the tendency of the rod 68 to regain its normal position, and the said hooked end engaging with the stop 64 will move the plate 31 to the left. The pitman will now begin to move toward the rear and will engage with the rod 69, which by reason of its diagonal position will tend to force the hooked end of the pitman close against the left-hand side or edge of the strip 67, and when the said hooked end clears the rear end of the strip 67 it will be flirted to the right by the spring action of the rod 69, and engaging with the stop 65 will move the plate 31 to the left. Thus it will be seen that the stops 64 and 65 will alternately be brought into alinement with the strip 67 and will be engaged by the hooked end of the pitman 66, and the latter being moved laterally in opposite directions by the spring action of the parts 68 and 69 will impart a reciprocating movement to the plate 31, which motion will be transmitted to the lever 28 by means of the pin 30 in the manner set forth, thereby operating the seed-dropping mechanism, so as to deposit the seed in the furrows formed by the runners 1.

The mechanism for actuating the markers will be so timed that the earth will be indented adjacent to the hill, thereby indicating the spot where the seed is planted, so as to enable the operator to plant the grain in check-rows. The wheels 45, tracking in the furrows, will cover the seed and compress the earth to such a degree as to hasten germination. One of the ground-wheels is provided with a pawl 74, and that portion of the crank-axle 3 adjacent to the wheel carrying the pawl is provided with a ratchet-wheel 75, the teeth of which are engaged by the pawl 74 to cause the ground-wheel and axle to rotate together when the machine is in gear. In the event of the machine planting out of line the pawl 74 is disconnected from the ratchet-wheel 75 and the crank-axle is turned by the application thereto of a wrench or suitable tool, so as to bring the parts in proper position to drop the seed in check-rows. After the machine is alined the pawl 74 is engaged with the teeth of the ratchet-wheel 75 and the planting is effected automatically by drawing the machine over the field. In the event of a team of horses being required to move the machine the pole or tongue 2 will be supplied with a doubletree 76, having the complement of singletrees 77, and will be provided at its front end with a neck-yoke 78. The driver's seat 79 is located about over the cross-bar 41 and is secured to an arched bar 80, fastened at its extremities to a convenient portion of the main frame. The lever 6 and the pole 49 are within convenient reach of the driver's seat, thereby obviating the necessity for the driver to dismount for the purpose of shifting the pole 49 to throw the blade 50 from one side of the machine to the other and for raising and lowering the machine.

Having thus described the invention, what is claimed as new is—

1. In a planter, the combination with the seed-dropping mechanism, of actuating mechanism therefor comprising a reciprocating plate having oppositely-disposed stops, a fixed strip, a reciprocating pitman, and diagonally-disposed rods or bars capable of yielding and adapted to hold the said pitman against the opposite sides of the aforesaid strip and to bring it in positive engagement with the stops of the reciprocating plate to move the latter alternately in opposite directions, substantially in the manner set forth.

2. In a planter, the combination with the seed-dropping mechanism, of the following instrumentalities for actuating the said seed-dropping mechanism, comprising a strip, a reciprocating plate having oppositely-disposed stops arranged to be alternately brought into alinement with the said strip, yielding rods or bars diagonally disposed with respect to the said strip, and a reciprocating pitman having a portion operating in the space between the said diagonally-disposed rods or bars and moved laterally thereby to effect a shifting of the reciprocating plate, substantially in the manner described for the purpose set forth.

3. The herein-described mechanism for actuating the seed-dropping devices of a planter, comprising a plate having an opening and inwardly-extending stops at opposite sides of the said opening, a strip disposed at right angles to the reciprocating motion of the plate and having its ends beveled, rods or bars extending about in paralled relation and diagonally with respect to the said strip, and supported at opposite ends and adapted to yield at their free ends, and a reciprocating pitman having a portion operating in the space between the said diagonally-disposed rods or bars and moved by the latter from one side to the other of the strip, whereby the said plate is reciprocated, substantially in the manner set forth for the purpose described.

4. In a planter, the combination with the seed-dropping mechanism, of a table, a plate mounted upon the table and guided in its reciprocating movements, and having an opening provided with inwardly-extending stops at its opposite sides, a longitudinal strip secured to the table and having its ends oppositely beveled, bars or rods extending over the strip in diagonal relation thereto and secured at one end to the table, springs having connection with the free ends of the said rods or bars, and a reciprocating pitman having a portion operating in the space between the said diagonally-disposed rods and moved by the latter from one side to the other of the strip and against the stops of the aforesaid plate to effect a reciprocating movement of the latter, substantially as set forth for the purpose described.

5. In a planter, the combination of the seed-dropping mechanism, a vibrating lever, a block having adjustable connection with the vibrating lever so as to be movable to and from the fulcrum thereof, and a pitman connection between the said adjustable block and the seed-dropping mechanism to transmit motion to the latter, substantially as set forth.

6. In a planter, the combination of the seed-dropping mechanism, a vibrating lever having a slot in one end, a block slidably fitted in the said slot and adapted to be secured therein at any required position, and a pitman connecting the slidable block with the seed-dropping mechanism to transmit motion to the latter, substantially in the manner and for the purpose set forth.

7. In a planter, the combination of the seed-dropping mechanism, a lever fulcrumed at an intermediate point and having longitudinal slots at its ends, a block adjustably mounted in a slotted end of the lever and having connection with the said seed-dropping mechanism, a reciprocating plate, and a pin projecting from the reciprocating plate and operating in the other slotted end of the said lever, substantially as and for the purpose set forth.

8. In a planter, the combination of a runner having parallel grain-passages in its rear side and a space at its lower rear end, a lever fulcrumed to the rear side of the runner and having a lug to operate in the said space and alternately close the lower ends of the grain-passages, a seed-slide having connection with the said lever, a vibrating lever 28, a block having adjustable connection with the lever 28, a pitman connection between the seed-slide and the said adjustable block, and actuating mechanism for operating the vibrating lever, substantially as and for the purpose set forth.

9. In a planter, the combination with the seed-dropping mechanism, and an axle having a crank portion, of a marker mounted upon the said crank portion, and a guide for normally holding the marker in an upright position and directing it during its reciprocating movements, substantially as and for the purpose set forth.

10. In a planter, the combination of an axle having a crank portion, a marker mounted upon the said crank portion, and an arm having connection with the marker and adapted to engage with a portion of the frame to give proper direction to the marker, substantially as and for the purpose set forth.

11. In a planter, the combination of the frame having a notch, an axle having a crank portion, a marker mounted upon the said crank portion, a guide-arm having connection with the marker and operating in the aforesaid notch, and a plate for closing the notch removably fitted to the frame, substantially as and for the purpose set forth.

12. A planter comprising in its organization the following elements in combination: a draft-frame supporting the hoppers and the seed-dropping mechanism, a main frame having a pivotal connection with the draft-frame, a lever and connections between the main and draft frames to adjust them relatively in the manner set forth, an axle journaled to the main frame and having crank portions near each end, ground-wheels at the ends of the axle, a ratchet-and-pawl connection between one of the ground-wheels and the axle to admit of the alining of the machine in the manner set forth, markers mounted upon the crank portions of the axle and having guide-arms to engage with a portion of the framework, and covering-wheels tracking in the path of the runners, substantially in the manner and for the purpose set forth.

In testimony that I claim the foregoing as my own I have hereto affixed my signature in the presence of two witnesses.

JOHN W. SVOBODA.

Witnesses:
ADOLPH FOLDA,
A. F. LANE.